United States Patent Office 3,325,486
Patented June 13, 1967

3,325,486
PHENTHIAZINE-AMIDE ESTER DERIVATIVES AND PROCESS FOR THEIR PREPARATION
Lajos Toldy, Jozsef Borsi, Marton Fekete, and Boris Dumbovich, Budapest, Hungary, assignors to Egyesült Gyógyszer-és Tápszergyár, Budapest, Hungary, a firm
No Drawing. Filed May 31, 1963, Ser. No. 284,337
5 Claims. (Cl. 260—243)

The present invention relates to new phenothiazine-amide ester derivatives having valuable therapeutical properties, and to the procedure of the preparation thereof.

It has been found that the phenothiazine amide derivatives of the Formula I

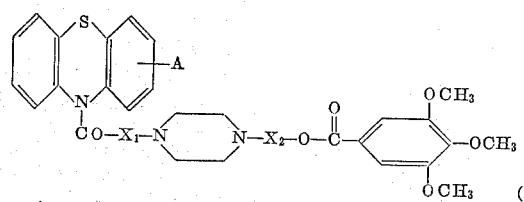

wherein $X_1$ and $X_2$ are equal or different and represent bivalent straight or branched chain alkylene groups of 1 to 4 carbon atoms. A represents hydrogen or halogen atoms, or a methoxy radical which show very valuable pharmacological properties. These compounds exert a lasting dilatory effect on the coronary arteries, some of these compounds have sedative, antiemetic, hypotensive, spasmolytic and antihistaminic effects too; their toxicity is very low.

Some typical representative of this new class of compounds, e.g. the 3,4,5-trimethoxy benzoic acid ester of the 3-chloro-10[4'-(β-hydroxyethyl)-piperazinyl-1']-acetyl-phenothiazine, the 3,4,5-trimethoxy benzoic acid ester of the 3-chloro-10 - β-[4'-(β-hydroxyethyl)-piperazinyl-1']-propionyl-phenothiazine, the 3,4,5-trimethoxy benzoic acid ester of the 3-methoxy-10-[4'-(β-hydroxyethyl) piperazinyl-1']-acetyl-phenothiazine and the 3,4,5-trimethoxy benzoic acid ester of the 3-methoxy-10-β-[4'-(β-hydroxyethyl)-piperazinyl-1'] - propionyl - phenothiazine show, by Langendorff's method, a 2 or 3 times stronger dilatory effect than the papaverine on the coronary arteries of isolated guinea pig hearts; their effect is also considerably more prolonged. The same effects may be produced also in vivo. The compounds mentioned above in oral doses of 20 mg./kg. inhibit on rats to 30–40% the coronary constrictor effect produced by a 1 U/kg. i.v. dose of vasopressine. At the same time the toxicity of these compounds is very slight, their $LD_{50}$ value on mice is in the case of oral administration between 0.75 and 2.0 g./kg.

The new compounds of Formula I may be prepared by reacting a phenothiazine derivative of the Formula II

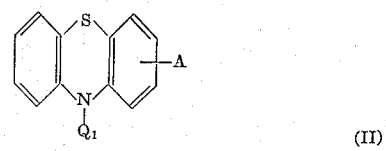

with the compound of the Formula III $$Q_2—R \quad (III)$$

wherein A has the same meaning as above and R has the formula:

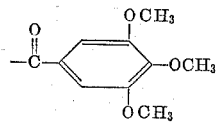

whereas $Q_1$ and $Q_2$ represent groups capable to react with each other while forming a group of the Formula IV

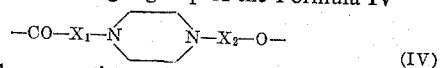

attached to the respective residues of the compounds of the Formula II and III; the symbols $X_1$ and $X_2$ have here the same meaning as above.

The procedure defined in generic terms as above may be performed in different ways. According to a specific embodiment of this procedure compounds of the Formula V

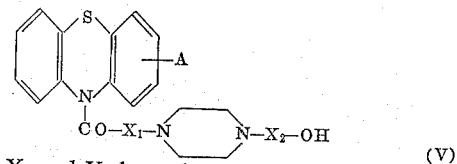

wherein A, $X_1$ and $X_2$ have the same meaning as above, or reactive derivatives, e.g. halogenides or alkali metal derivatives thereof are esterified with a carboxylic acid of the Formula VI $$HO—R \quad (VI)$$

wherein R is the 3,4,5-trimethoxy benzoyl radical.

This esterifying reaction may be carried out preferably in the presence of an indifferent solvent as toluene, benzene, chloroform, dichloroethane, etc., and, if desired, in the presence of an acid binding agent, e.g. of organic or inorganic bases. When using organic bases, e.g. pyridine as acid binding agents, same may serve simultaneously as solvents too. It may be in some cases preferable to carry out this esterifying reaction in the presence of catalysts or to remove the water formed in the course of the reaction immediately by azeotropic distillation.

The phenothiazine derivatives of Formula V used as starting materials are also new compounds; they may be prepared by reacting phenothiazine derivatives of the Formula VII

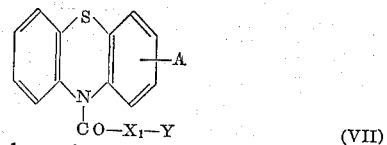

wherein A, and $X_1$ have the same meaning as above and Y stands for the acid residue of a reactive ester, e.g. for a halogen atom, a sulphuric, phosphoric or sulphonic acid residue, with a piperazine derivative of the Formula VIII

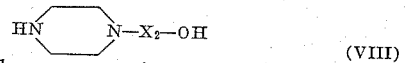

wherein $X_2$ has the same meaning as above, for instance with N-β-hydroxyethyl-piperazine, N - β - hydroxypropyl-piperazine or N-γ-hydroxypropyl-piperazine. This reaction may be carried out in the presence of an indifferent solvent, e.g. benzene, toluene or acetone, at room temperature or at elevated temperatures, and, if necessary, in the presence of an acid binding agent; an excess of the piperazine derivative may be used as well for the latter purpose.

According to another embodiment of the generic process defined above, the compounds of the Formula I may be prepared by reacting phenothiazine derivatives of the Formula IX

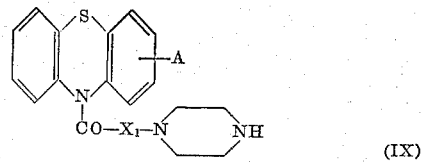

wherein A, and $X_1$ have the same meaning as above, with compounds of the Formula X $$Y—X_2—O—R \quad (X)$$

wherein R, $X_2$ and Y have the same meaning as above. This reaction may be carried out in an analogous way as described above in the case of the preparation of compounds of the Formula V.

According to a further embodiment of the generic procedure defined above, the compounds of the Formula I may also be prepared by reacting phenothiazine derivatives of the Formula VII

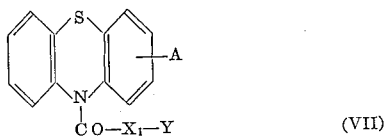

wherein A, $X_1$ and Y have the same meaning as above, with compounds of the Formula XI

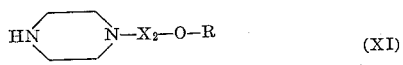

wherein $X_2$ and R have the same meaning as above. These reactions can be carried out in a similar way as described above in the case of the preparation of compounds of the Formula V.

According to a still further embodiment of the said generic procedure, the compounds of the Formula I may also be prepared by reacting phenothiazine derivatives of the Formula XII

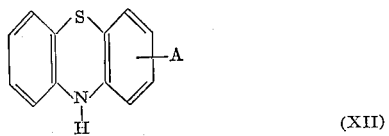

wherein A has the same meaning as above, with piperazine derivatives of the Formula XIII

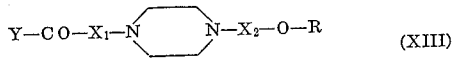

wherein $X_1$, $X_2$, Y and R have the same meaning as above. This reaction may be carried out preferably in the presence of an indifferent solvent, e.g. an aromatic hydrocarbon, at elevated temperatures, in the presence of an alkaline condensing agent, e.g. of sodium amide or sodium oxide.

The new phenothiazine amide ester derivatives of the Formula I may be used therapeutically in the form of free bases or of acid addition salt formed with pharmaceutically acceptable, i.e. non-toxic inorganic or organic acids (e.g. hydrochlorides, sulphates, phosphates, ethanesulphonates, fumarates, maleates, succinates, tartarates, ascorbates, etc.); they may be used also in the form of quaternary derivatives prepared in the known manner.

The invention is illustrated by the following examples:

EXAMPLE 1

3-chloro-10-chloroacetyl-phenothiazine (30 g.) is dissolved in acetone (300 ml.) and N-β-hydroxyethyl-piperazine (30 g.) is added to the solution. The mixture is left to stand overnight at room temperature, and after sucking off the precipitated N-β-hydroxyethyl-piperazine hydrochloride, the solution is diluted to 1 liter; a product is precipitating which gets soon solid while standing. The obtained 3 - chloro - 10 - [4' - (β - hydroxyethyl) - piperazinyl-1']-acetyl phenothiazine melts after recrystallization from abs. ethanol at 145–157° C.

3 - chloro - 10 - [4 - (β - hydroxyethyl) - -piperazinyl-1']-acetyl-phenothiazine (4 g.) is dissolved in dichloroethane (35 ml.) and 3,4,5-trimethoxybenzoyl chloride 2.7 g.) is added to the solution. After standing overnight the solution is shaken out with aqueous sodium bicarbonate solution, then with water and the dichloroethane is then distilled off. The 3,4,5-trimethoxybenzoic acid ester of 3 - chloro - 10 - [4' - (β - hydroxyethyl) - piperazinyl-1']-acetyl-phenothiazine is obtained as residue; the di-ethanesulphonate of this ester prepared from methyl ethyl ketone solution melts at 189–192° C.

The difumarate of the ester melts at 208–210° C.

In a similar way may be obtained the corresponding N-β-hydroxy-propyl-piperazine derivative (its difumarate melts at 203–205° C.) and the N-γ-hydroxy-propyl-piperazine-derivative (M.P. of the difumarate 205–207° C.) too.

EXAMPLE 2

The procedure as described in Example 1 is repeated with the difference that the 3 - chloro - 10 - [4' - (β - hydroxyethyl) - piperazinyl - 1'] - acetyl - phenothiazine is reacted with acetyl chloride instead of 3,4,5-trimethoxybenzoyl chloride. The syrupy acetic acid ester of 3-chloro-10 - [4' - (β-hydroxyethyl) - piperazinyl - 1'] - acetyl-phenothiazine is obtained in this way.

EXAMPLE 3

The procedure as described in Example 1 is repeated with the difference that the 3 - chloro - 10 - [4'(β - hydroxy - ethyl) - piperazinyl - 1'] - acetyl - phenothiazine is reacted with diphenylacetyl chloride instead of 3,4,5-trimethoxybenzoyl chloride. The diphenylacetic acid ester of 3 - chloro - 10 - [4'(β - hydroxyethyl) - piperazinyl-1'] - acetyl - phenothiazine is obtained in this way; the difumarate of this ester melts after recrystallization from abs. ethanol at 211–213° C.

EXAMPLE 4

The procedure as described in Example 1 is repeated with the difference that the 3 - chloro - 10 - [4' - (β - hydroxy - ethyl) - piperazinyl - 1'] - acetyl - phenothiazine is reacted with 3,4-dimethoxybenzoyl chloride instead of 3,4,5 - trimethoxybenzoyl chloride. The 3,4 - dimethoxybenzoic acid ester of 3 - chloro - 10 - [4' - (β - hydroxyethyl)-piperazinyl-1']-acetyl-phenothiazine is obtained in this way; the di-ethanesulphonate of this ester decomposes at 170–175° C.

EXAMPLE 5

3 - chloro - 10 - (β - chloro - propionyl) - phenothiazine (19 g.) and N-β-hydroxyethyl-piperazine (20 g.) are boiled in abs. benzene (200 ml.) for 7 hours. The precipitated N-β-hydroxyethyl-piperazine hydrochloride is separated and the benzene solution is extracted with a 15 percent aqueous tartaric acid solution. The aqueous extract is made alkaline to phenolphthalein by adding potassium carbonate solution while cooled with ice, and the formed precipitate is taken up with chloroform. After distilling off the chloroform 3 - chloro - 10 - β - [4' - (β-hydroxyethyl) - piperazinyl - 1'] - propionyl - phenothiazine is obtained as residue; the di-ethanesulphonate of this product prepared from methyl ethyl ketone solution melts after recrystallization from isopropanol at 165–168° C.

This di-ethanesulphonate (5 g.) is dissolved in water (20 ml.), aqueous sodium bicarbonate solution is then added and the formed precipitate is taken up with dichloroethane. 3,4,5-trimethoxybenzoyl chloride (2 g.) is added to the dried solution which is, after standing overnight, shaken out with aqueous sodium bicarbonate solution and then with water. The dichlorethane is distilled off; the 3,4,5-trimethoxybenzoic acid ester of 3-chloro-10-β - [4' - (β - hydroxyethyl) - piperazinyl - 1'] - propionyl-phenothiazine is obtained as residue. The difumarate of this ester, prepared from abs. ethanolic solution, melts at 180–185° C.

EXAMPLE 6

10-chloroacetyl-phenothiazine (10 g.) is dissolved in acetone (100 ml.) and N - β - hydroxyethyl - piperazine (8.7 g.) is added to the solution. After standing overnight the mixture is diluted to 500 ml. with water and distilled in vacuo on a steam bath. A crystalline precipitate is formed parallelly with the removal of the acetone; this precipitate is then sucked off. The 10 - [4' - (β - hydroxy ethyl)-piperazinyl-1']-acetyl-phenothiazine obtained in this way melts after recrystallization from methyl ethyl ketone at 120–122° C.

10 - [4' - (β - hydroxyethyl) - piperazinyl - 1'] - acetyl-phenothiazine (6 g.) is dissolved in dichloroethane (60 ml.) and 3,4,5-trimethoxybenzoyl chloride (4.3 g.) is added to the solution. Proceeding further as described in Example 1, the 3,4,5-trimethoxybenzoic acid ester of 10-[4'(β - hydroxyethyl) - piperazinyl - 1'] - acetyl - phenothiazine is obtained; the difumarate of this ester melts at 190–192° C.

EXAMPLE 7

10-β-chloro-propionyl-phenothiazine (20 g.) and N-β-hydroxyethyl-piperazine (22 g.) are boiled in abs. benzene (200 ml.) for 6 hours; the reaction mixture is then treated further as described in Example 5. The di-ethanesulphonate of the obtained 10-β-[4'-(β-hydroxyethyl)-piperazinyl - 1'] - propionyl - phenothiazine melts at 164–167° C.

This di-ethanesulphonate (8.2 g.) is dissolved in water, the solution cooled with ice and made alkaline to phenolphthalein with potassium carbonate. The liberated basis is extracted with dichloroethane and the dichloroethane extract treated further as described in Example 5. The 3,4,5-trimethoxy-benzoic acid ester of 10 - β - [4' - (β - hydroxyethyl) - piperazinyl - 1'] - propionyl - phenothiazine obtained is transformed in abs. ethanolic solution into the difumarate; M.P. 200–202° C.

EXAMPLE 8

3-methoxy-10-chloroacetyl-phenothiazine (12 g., prepared from 3-methoxy-phenothiazine and chloroacetyl-chloride by boiling in toluene solution; M.P. after recrystallization from isopropanol 130–134° C.) is dissolved in acetone (150 ml.) and N-β-hydroxyethyl-piperazine (12 g.) is added to the solution. After standing overnight the mixture is diluted with water to 500 ml., then distilled in vacuo on the steam bath. A syrupy product separates after the evaporation of the acetone; this product is extracted with chloroform. The chloroform is then distilled off and 3-methoxy-10-[4'-(β-hydroxyethyl)-piperazinyl-1']-acetyl phenothiazine is obtained as residue; its difumarate prepared from abs. ethanol decomposes at 140° C.

This difumarate is suspended in ice water and made alkaline with potassium carbonate; the mixture is then shaken with dichloroethane till the dissolution is complete. The dichloroethane solution is separated and dried, then 3,4,5-trimethoxybenzoyl chloride is added in a 20 percent excess. After standing overnight the solution is shaken out with aqueous sodium bicarbonate solution, then with water. The dichloroethane is distilled off and the 3,4,5-trimethoxy-benzoic acid ester of 3-methoxy-10-[4' - (β - hydroxyethyl) - piperazinyl - 1'] - acetyl-phenothiazine is obtained as residue. The difumarate of this ester melts at 160–165° C.

EXAMPLE 9

3-methoxy - 10 - (β - chloro - propionyl) - phenothiazine (7 g.; prepared by boiling of 3-methoxy-phenothiazine with β-chloropropionyl chloride in toluene solution; M.P. 112–113° C.) and N-β-hydroxyethyl-piperazine (7 g.) are boiled in abs. benzene (100 ml.) for 6 hours. By operating further as described in Example 5, 3-methoxy - 10 - β - [4' - (β - hydroxyethyl) - piperazinyl - 1'] - propionyl - phenothiazine is obtained; the difumarate of this product decomposes at 178–182° C.

The free base obtained from this difumarate is transformed in similar manner as described in Example 8 into the 3,4,5-trimethoxybenzoic acid ester of 3-methoxy-10-β-[4' - (β - hydroxyethyl) - propionyl - phenothiazine. The difumarate of this ester melts at 168–171° C.

EXAMPLE 10

2,3 - dimethoxy - 10 - chloroacetyl - phenothiazine (10 g., prepared by boiling of 2,3-dimethoxy - phenothiazine with chloroacetyl chloride in toluene solution; M.P. after recrystallization from isopropanol 113–115° C.) is dissolved in acetone (100 ml.) and N-β-hydroxyethyl piperazine (11 g.) is added to the solution. After standing overnight, the precipitated hydrochloride of N-β-hydroxyethyl-piperazine is separated and the acetone solution is diluted with water to 500 ml. The acetone is distilled off in vacuo on the steam bath and the residual aqueous solution is made alkaline with potassium carbonate while cooled with ice. The separating syrupy product is extracted with chloroform, the chloroform solution is dried over anhydrous magnesium sulphate and evaporated. 2,3-dimethoxy - 10 - [4' - (β - hydroxyethyl) - piperazinyl-1']-acetyl-phenothiazine is obtained as residue; the difumarate of this product, prepared from abs. ethanolic solution, decomposes at 140–142° C.

The free base obtained from this difumarate is transformed in a similar way as described in Example 8, into the 3,4,5-trimethoxybenzoic acid ester of 2,3-dimethoxy-10[4' - (β - hydroxyethyl) - piperazinyl - 1'] - acetyl-phenothiazine.

EXAMPLE 11

2,3 - dimethoxy - 10 - (β - chloropropionyl) - phenothiazine (7 g., prepared by boiling of 2,3-dimethoxy-phenothiazine with β-chloropropionyl chloride in toluene solution; M.P. after recrystallization from isopropanol 118–120° C.) is transformed in a similar way as described in Example 9 into the 2,3-dimethoxy-10-β-[4'-(β-hydroxyethyl) - piperazinyl - 1'] - propionyl - phenothiazine. This product is purified through its difumarate; the difumarate is then treated as described in Example 8 to obtain the 3,4,5-trimethoxybenzoic acid ester of 2,3-dimethoxy - 10 - β - [4 - (β - hydroxyethyl) - piperazinyl-1']-propionyl-phenothiazine.

EXAMPLE 12

A stirred mixture of 3-chloro-10-piperazine-acetyl-phenothiazine (0.1 mole), 3,4,5-trimethoxybenzoic acid β-bromo-ethyl ester (0.11 moles) and potassium carbonate (0.55 moles) in abs. toluene (300 ml.) is boiled for 15 hours. The mixture is then shaken out with water and the toluene is distilled off in vacuo. The raw 3,4,5-trimethoxybenzoic acid ester of 3-chloro-10-[4'-(β-hydroxyethyl) - piperazinyl - 1'] - acetyl - phenothiazine obtained as residue is then transformed in abs. ethanolic solution into the difumarate; M.P. 208–210° C.

EXAMPLE 13

3 - chloro - 10 - chloroacetyl - phenothiazine (0.1 mole) is dissolved in acetone (200 ml.) and N-β-(3,4,5-trimethoxy-benzoyloxy)-ethyl-piperazine (0.22 mole) is added to the solution. After standing overnight the mixture is diluted with water and the acetone is removed by distillation in vacuo on the steam bath. A product separates which is extracted with chloroform and the chloroform is distilled off; by treating the residue in abs. ethanolic solution with fumaric acid, the difumarate of the 3,4,5-trimethoxybenzoic acid ester of 3-chloro-10-[4'-(β-hydroxyethyl) - piperazinyl - 1'] - acetyl - phenothiazine is obtained; M.P. 208–210° C.

In a similar way as described above may be prepared also the following further new phenothiazine derivatives:

3,4,5-trimethoxybenzoic acid ester of 3-chloro-10-α-[4'-(β - hydroxyethyl) - piperazinyl - 1'] - propionyl - phenothiazine; M.P. of the dioxalate 192–194° C.

3,4,5-trimethoxybenzoic acid ester of 3-chloro-10-β-[4'-(β - hydroxypropyl) - piperazinyl - 1'] - propionyl-phenothiazine; M.P. of the difumarate 160–162° C.

3,4,5 - trimethoxybenzoic acid ester of 3-chloro-10-α-[4' - (β - hydroxypropyl) - piperazinyl - 1'] - propionyl-phenothiazine; M.P. of the dioxalate 185–192° C.

3,4,5-trimethoxybenzoic acid ester of 3-methoxy-10-β-[4' - (β - hydroxypropyl) - piperazinyl - 1'] - propionyl-phenothiazine; M.P. of the difumarate 168–170° C.

3,4,5-trimethoxybenzoic acid ester of 3-methoxy-10-[4'-(β - hydroxypropyl) - piperazinyl - 1'] - acetyl - phenothiazine; M.P. of the difumarate 175–177° C.

What is claimed is:

1. A compound of the formula

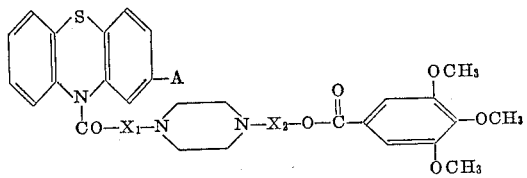

wherein $X_1$ and $X_2$ are members selected from the group consisting of straight and branched chain alkylene groups of 1–4 carbon atoms, A is a member selected from the group consisting of hydrogen, chlorine and methoxy radicals.

2. The 3,4,5-trimethoxy benzoic acid ester of 3-chloro-10-[4'-(β-hydroxyethyl)-piperazinyl-1']-acetyl phenothiazine.

3. The 3,4,5-trimethoxy benzoic acid ester of 3-chloro-10-β-[4' - (β-hydroxyethyl) - piperazinyl-1'] - propionyl phenothiazine.

4. The 3,4,5-trimethoxy benzoic acid ester of 3-methoxy-10-[4'-(β-hydroxyethyl)-piperazinyl-1']-acetal phenothiazine.

5. The 3,4,5-trimethoxy benzoic acid ester of 3-methoxy-10-β-[4'-(β-hydroxyethyl) - piperazinyl-1']-propionyl phenothiazine.

References Cited

UNITED STATES PATENTS

| | | | |
|---|---|---|---|
| 2,766,235 | 10/1956 | Cusic | 260—243 |
| 2,890,219 | 6/1959 | Cusic | 260—243 |
| 2,969,358 | 1/1961 | Cusic | 260—243 |

FOREIGN PATENTS

| | | |
|---|---|---|
| 912,973 | 12/1962 | Great Britain. |

OTHER REFERENCES

Bourquin et al., Helv. Chem. Acta, vol. XLI, No. 4 (1958), pp. 1094–99.

Gritsenko et al., Zhur. Obsh. Khim, vol. 30 (1960), pp. 2640–45.

Anderson et al., Arzneimettelforschung, vol. 12 (September 1962), pp. 937–42.

WALTER A. MODANCE, *Primary Examiner.*

HARRY I. MOATZ, *Assistant Examiner.*